(12) United States Patent
Reusche et al.

(10) Patent No.: US 7,941,040 B2
(45) Date of Patent: *May 10, 2011

(54) SYSTEMS AND METHODS FOR SMART DEICERS

(75) Inventors: Thomas K. Reusche, Elburn, IL (US); Philip E. Chumbley, Aurora, IL (US); James R. McHugh, Downers Grove, IL (US)

(73) Assignee: Allied Precision Industries, Inc., Elburn, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 12/687,598

(22) Filed: Jan. 14, 2010

(65) Prior Publication Data

US 2010/0116815 A1    May 13, 2010

Related U.S. Application Data

(63) Continuation of application No. 11/413,896, filed on Apr. 28, 2006, now Pat. No. 7,680,400.

(60) Provisional application No. 60/677,253, filed on May 3, 2005, provisional application No. 60/685,987, filed on May 31, 2005, provisional application No. 60/681,755, filed on May 17, 2005, provisional application No. 60/681,799, filed on May 17, 2005, provisional application No. 60/690,464, filed on Jun. 14, 2005, provisional application No. 60/698,029, filed on Jul. 11, 2005, provisional application No. 60/740,428, filed on Nov. 29, 2005, provisional application No. 60/741,832, filed on Dec. 2, 2005.

(51) Int. Cl.
*H05B 3/80* (2006.01)
*H05B 3/40* (2006.01)

(52) U.S. Cl. ........................................ 392/499; 392/497
(58) Field of Classification Search .................. 392/497, 392/499

See application file for complete search history.

(56) References Cited

U.S. PATENT DOCUMENTS

| | | | | |
|---|---|---|---|---|
| 2,430,272 A * | 11/1947 | Brodie | ........................... | 119/73 |
| 2,472,178 A * | 6/1949 | Temple | ........................ | 392/499 |
| 2,514,559 A * | 7/1950 | Riemenschneider | ......... | 392/499 |
| 2,520,576 A * | 8/1950 | Stookey | ........................ | 392/499 |
| 2,561,932 A * | 7/1951 | Landgraf | ........................ | 119/73 |
| 3,096,425 A * | 7/1963 | Keating et al. | ................ | 392/499 |
| 4,835,366 A * | 5/1989 | Owen et al. | .................... | 392/499 |
| 5,245,691 A * | 9/1993 | Wu | ...................................... | 392/365 |
| 5,933,575 A * | 8/1999 | Sanders | ........................ | 392/501 |
| 6,211,493 B1 * | 4/2001 | Bouman | ........................ | 219/213 |
| 6,246,831 B1 * | 6/2001 | Seitz et al. | .................... | 392/486 |
| 6,778,763 B1 * | 8/2004 | Reusche et al. | ................ | 392/499 |
| 7,230,213 B2 * | 6/2007 | Naylor | ........................... | 219/528 |

* cited by examiner

*Primary Examiner* — Thor S Campbell
(74) *Attorney, Agent, or Firm* — McAndrews, Held & Malloy, Ltd.

(57) ABSTRACT

Certain embodiments of the present invention provide a deicer system for heating water within a fluid receptacle to prevent ice from forming, the system including a main body configured to be positioned within the fluid receptacle, a heating element adapted to heat the water, a temperature sensor adapted to detect a temperature of the water, a switch adapted to activate and deactivate the heating element, and a control unit in communication with the heating element, the temperature sensor, and the switch. The heating element is supported by the main body. The control unit is adapted to control the heating element using the switch based at least in part on a temperature detected by the temperature sensor.

31 Claims, 9 Drawing Sheets

SYSTEMS AND METHODS FOR SMART DEICERS

RELATED APPLICATIONS

The present application is a continuation of U.S. application Ser. No. 11/413,896, entitled "Systems and Method for Smart Deicers," filed Apr. 28, 2006, now U.S. Pat. No. 7,680,400, which, in turn, relates to and claims the benefit of U.S. Provisional App. No. 60/677,253, entitled "System and Method for Controlling a Deicer," filed May 3, 2005; U.S. Provisional App. No. 60/685,987, entitled "System and Method for Controlling a Deicer," filed May 31, 2005; U.S. Provisional App. No. 60/681,755, entitled "Dual-Mode Deicing System and Method," filed May 17, 2005; U.S. Provisional App. No. 60/681,799, entitled "Deicing System With Safety Tilt Switch," filed May 17, 2005; U.S. Provisional App. No. 60/690,464, entitled "Air Temperature Sensing for Deicer Control," filed Jun. 14, 2005; U.S. Provisional App. No. 60/698,029, entitled "Microprocessor-Controlled Electrical Outlet," filed Jul. 11, 2005; U.S. Provisional App. No. 60/740,428, entitled "Temperature-Controlled Outlet for Outdoor Use," filed Nov. 29, 2005; and U.S. Provisional App. No. 60/741,832, entitled "Operational Control of Deicers Using Multiple Temperature Detectors," filed Dec. 2, 2005. The foregoing applications are herein incorporated by reference in their entireties.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Embodiments of the present invention generally relate to a system and method of deicing water within a receptacle, such as a pond, birdbath, or the like. More particularly, embodiments of the present invention relate to systems and methods for smart deicers.

Heating or deicing systems have commonly been used to maintain unfrozen areas in fluids such as water. For example, deicing systems may be used in water tanks for livestock, fish ponds, and the like. Early deicers burned wood, coal, or gas while most deicers today are electric. A typical deicing system includes a heater coil. The heat from the coil is transferred to the fluid to keep the fluid from freezing. Electric deicers typically range from 1000 to 1500 watts and may include thermostats that are commonly used to turn the unit on or off in order to introduce heat into the fluid when freezing conditions exist.

Many property owners have ponds located within their property. During winter months in colder climates, the ponds tend to freeze over with ice. When the ponds freeze over, toxic gases are trapped under the ice and pose a hazard to fish living within the pond. If the frozen surface is not broken in order to allow toxic gases to escape, the water below the frozen surface may become overly concentrated with nitrates, for example. Thus, the ice typically is broken in order to allow the toxic gases to escape.

In order to gain access to water below the surface for various activities and provide a path for toxic gases to escape, the frozen surface of the water is typically broken, drilled, or the like, in order to provide an accessible path to the water below. However, conventional methods of providing access to the water are typically labor-intensive, time-consuming, and typically do not prevent subsequent freezing.

As an alternative to conventional methods, pond heaters may maintain an ice-free area within a body of water. However, typical pond heaters are expensive to operate because they operate between approximately 1000 and 1500 watts or more, and, as such, may be dangerous.

Deicers typically are one of three types: (1) floating deicers, wherein the heating element is suspended from a floatation device such that it operates near the surface of the fluid; (2) sinking deicers, wherein the deicer rests upon the bottom of the pond or tank, usually attached to a guard such that the heating element is not in direct contact with the bottom; or (3) drain plug deicers mounted through the drain hole in a livestock tank.

Each of these three types has its own advantages and disadvantages. A floating deicer can more accurately measure the temperature at the surface where freezing will occur, thus it can be set more accurately to turn on at the optimum temperature. However, a deicer on the surface is also within reach of animals that may interfere with its operations or attempt to flip it out of the tank.

Sinking deicers, on the other hand, are often out of sight. However, because the deicer is positioned near the bottom of the fluid and freezing occurs at the top, a temperature gradient between the top and bottom of the fluid may exist. As such, the deicer may turn on at a higher temperature and heat more of the fluid, thereby having a reduced efficiency when compared to a floating deicer.

Drain plug deicers conveniently mount through the drain hole of a livestock tank where they are out of reach of animals and the cord can be protected. However, they also share the disadvantages of a sinking deicer, and have the additional disadvantage of requiring the tank to be drained in order to install the unit.

Different consumers will have their own preference for the type of deicer to use. However, it is not always known which type will work best for a particular application until one or more of the types have been tried. Therefore, a deicer that can be converted from a floater to a sinker would combine both types into one device and give greater flexibility to the user.

Deicers typically contain a thermostat to activate the heating element whenever the fluid temperature falls to a point where freezing may occur. The following discussion assumes the fluid is water, with a freezing point of 32 degrees Fahrenheit (F). In deicers with thermostats, the thermostat will normally turn on at around 40 degrees F. and will turn off after the water temperature has risen a number of degrees. While the water will not freeze until it reaches 32 degrees F., the set point for turning on the thermostat is usually situated around 40 degrees F. to accommodate the uncertainty in accurately determining the set point during production. That is, the set points of a batch of thermostats designed to turn on at 40 degrees F. may actually have a spread of +/−7 degrees F. around that temperature.

Thermostatically-controlled deicers include a thermostat that is placed in series with the heating element. The deicers are normally preset to turn on when the fluid temperature reaches a value approaching the freezing point and turn off when the fluid temperature reaches a value tens of degrees above the freezing point. The thermostat may include bimetal arms that serve as the electrical switch for the deicer. Thus, no additional components are required. The thermostat also serves as a safety device when a thermal path is provided from the heating element to the thermostat such that it will shut off if excess heat is detected. Excess heating may occur if the heater is removed from the fluid, for example.

The thermostats used in deicers are typically of the bimetal type. Typical turn-on/turn-off set points are around 45 degrees F. and 70 degrees F., respectively. However, the actual on/off temperatures of the thermostats are usually specified with a range of 5-8 degrees F. above and below these set points. While this range is necessary in order to keep the price of the thermostats down, it is not desirable from an operation standpoint since the deicer could turn on when the water temperature is only 50 degrees F. with no danger of freezing. For a 1500 watt deicer, the operation can therefore be needlessly expensive.

Because of the higher turn-on temperature, a deicer may operate to heat the water even on days when freezing conditions do not exist. For example, the temperature of the water in a livestock tank is directly affected by the surrounding air temperature. Thus, if the air temperature drops to 20 degrees F., the water will cool until it starts freezing at 32 degrees F. Since the water temperature has dropped below its 40 degree F. set point, a deicer placed in the tank will turn on and heat the water to keep it from freezing. Suppose now, however, that the air temperature is 35 degrees F.—three degrees above freezing. The water will tend to cool down to that temperature but, once its temperature drops below 40 degrees F., the deicer will turn on to heat the water even though the water was never in danger of freezing. In that situation, energy will be wasted in heating the water.

To prevent a deicer from turning on when the air temperature is above freezing, a common practice has been to plug the deicer into a thermally-controlled outlet that senses air temperature and passes power through the outlet only when the air temperature is below a certain point. While this procedure often works to increase the efficiency of the deicer by preventing it from turning on when the air temperature is high, the present thermally-controlled outlets suffer from numerous problems. One problem is that deicers typically draw 10 Amps or more of current. As a connector is used, the contacts tend to get worn thereby increasing the resistance at the contact point. With the thermostat located in close proximity to the contacts, the heat from the connections can influence the on/off operation of the thermostat with the result that the thermostatically-controlled outlet shuts off when it should actually be turned on.

Another problem is that the thermostat employed in the temperature-controlled outlet may exhibit hysteresis that negates its benefits. For example, consider a thermostat that turns on when the temperature drops to 35 degrees F. and turns off when the temperature rises to 45 degrees F., thus exhibiting a ten degree hysteresis. If the air temperature drops to 25 degrees F. the thermally-controlled outlet will be activated and a deicer plugged into it will be allowed to operate to keep the livestock tank from freezing. Suppose now, however, that the air temperature climbs to 39 degrees F. The tank is no longer in danger of freezing, but the deicer will still be allowed to turn on. Thus, energy is expended because the deicer is set to turn on at 40 degrees F. and the thermally-controlled outlet is still activated because the air temperature has not climbed above 45 degrees F.

Thus, it is highly desirable to have a deicer that is capable of making more intelligent decisions regarding temperature conditions. Therefore, there exists a need for a smart deicer.

BRIEF SUMMARY OF THE INVENTION

Certain embodiments of the present invention provide a deicer system for heating water within a fluid receptacle to prevent ice from forming, the system including a main body configured to be positioned within the fluid receptacle, a heating element adapted to heat the water, a temperature sensor adapted to detect a temperature of the water, a switch adapted to activate and deactivate the heating element, and a control unit in communication with the heating element, the temperature sensor, and the switch. The heating element supported by the main body. The control unit is adapted to control the heating element using the switch based at least in part on a temperature detected by the temperature sensor.

Certain embodiments of the present invention provide a deicer for heating water within a fluid receptacle to prevent ice from forming, the deicer including a main body configured to be positioned within the fluid receptacle, a heater adapted to heat the water, and a control unit in communication with the heater. The heater is supported by the main body. The control unit is adapted to control operation of the heater.

Certain embodiments of the present invention provide a method for controlling a heating element of a deicer system configured to be positioned within a fluid receptacle to prevent ice from forming within the fluid receptacle, the method including detecting a temperature of a fluid within the fluid receptacle, communicating the detected temperature to a control unit, determining whether the detected temperature is below a predetermined value stored within the control unit, and activating a heating element if the detected temperature is below the predetermined temperature.

Figure 1:
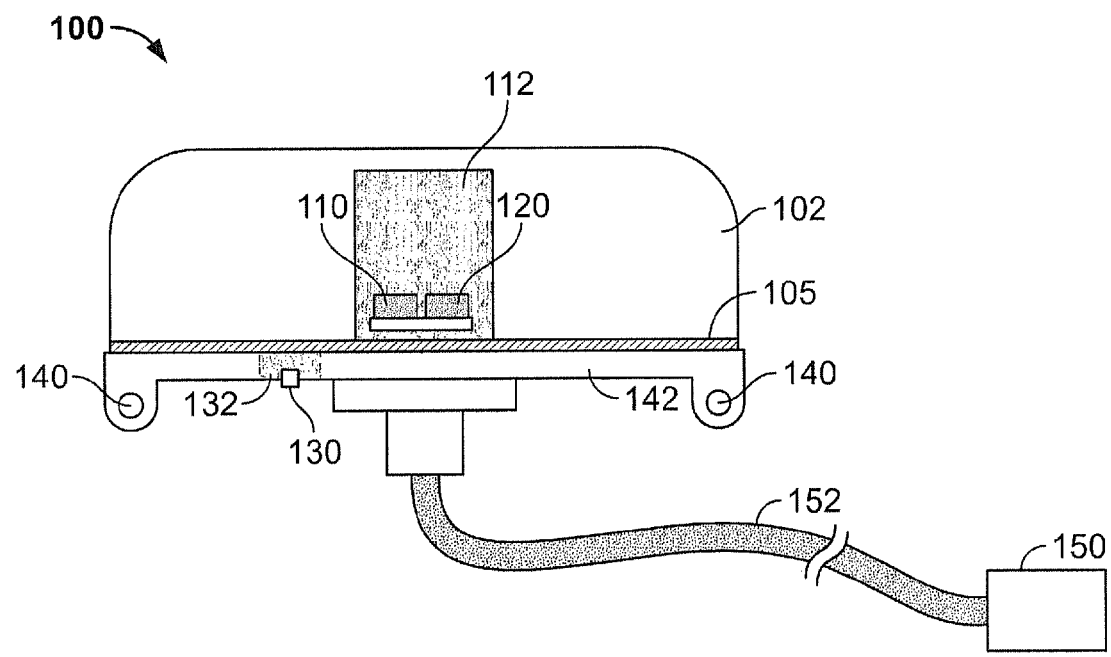
FIG. 1 illustrates a front perspective view of a deicing system according to an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

FIG. 1 illustrates a front perspective view of a deicing system 100 according to an embodiment of the present invention. The deicing system 100 includes a main body 105 configured to be positioned within a fluid receptacle. The main body 105 may include an annular frame or support, such as a ring, for example. The main body 105 supports a control unit 110, a switch 120, a temperature sensor 130, a heating element 140, and a power input component 150. In addition, as illustrated in FIG. 1, the deicing system 100 may include a float 102, an electronics cavity 112, a thermal isolating material 132, a plate 142, and a power cord 152. In certain embodiments, one or more of the elements illustrated in FIG. 1 may not be included.

Figure 2:
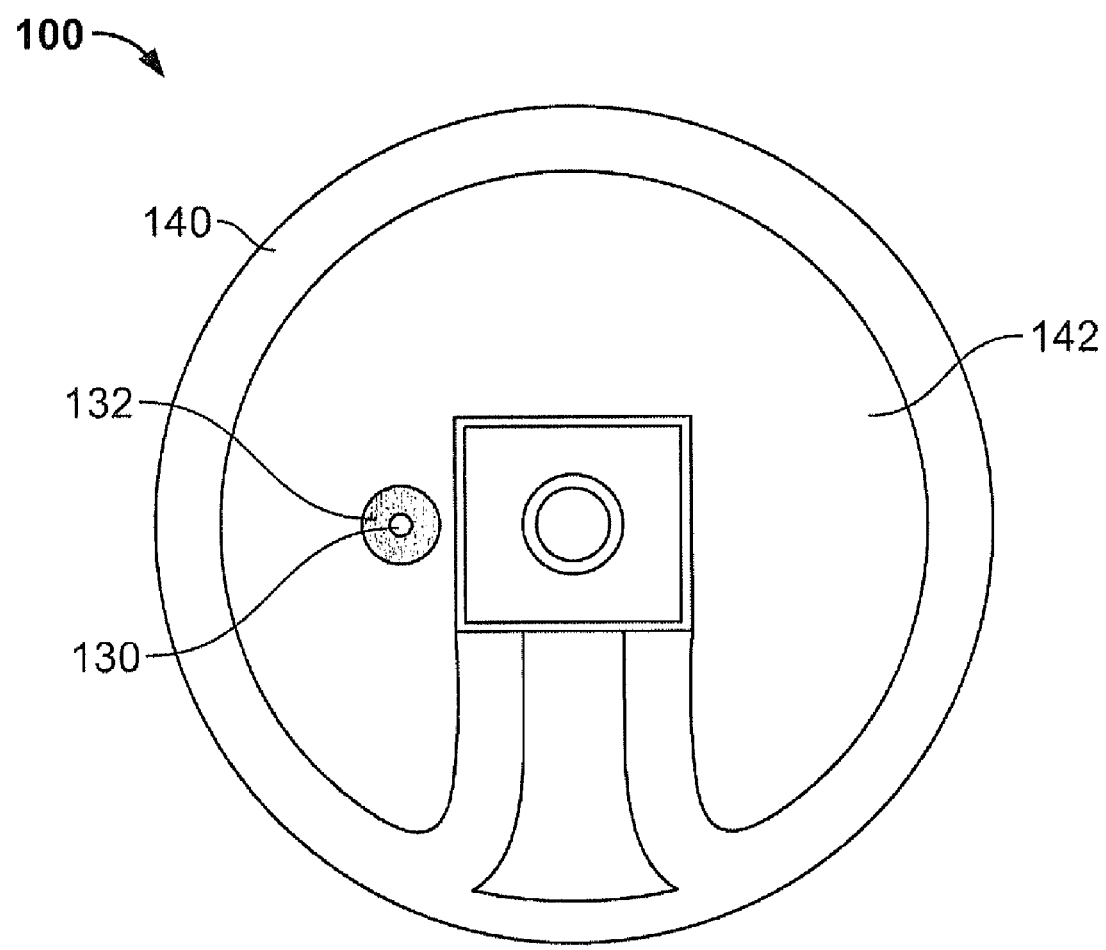
FIG. 2 illustrates a bottom perspective view of the deicing system according to an embodiment of the present invention.

FIG. 2 illustrates a bottom perspective view of the deicing system 100 according to an embodiment of the present invention. Referring to FIGS. 1 and 2, the control unit 110 is in electrical communication with the switch 120 and the temperature sensor 130. The power input component 150 is electrically coupled to the heating element 140. The power input component 150 may be electrically coupled to the heating element 140 through the power cord 152, for example. Further, the power input component 150 may be electrically coupled to the heating element 140 through the switch 120, for example.

In operation, the control unit 110 activates and/or deactivates the heating element 140 based at least in part on a temperature sensed by the temperature sensor 130. That is, the control unit 110 uses the switch 120 to control the flow of power from the power input component 150 to the heating element 140. When power flows to the heating element 140, the heating element 140 is activated to generate heat. When power is prevented from flowing to the heating element 140, the heating element 140 is deactivated, thereby not generating heat.

The control unit 110 is adapted to control the heating element 140. In certain embodiments, the control unit 110 controls the heating element 140 using the switch 120. As discussed above, the control unit 110 may use the switch 120 to activate and/or deactivate the heating element 140. In certain embodiments, the control unit 110 is adapted to control the heating element 140 based at least in part on a predetermined temperature, such as a stored temperature value within the control unit 110. The temperature may be a temperature determined and/or detected by temperature sensor 130, for example. In certain embodiments, the control unit 110 is adapted to control the heating element 140 based at least in part on a time interval. For example, the control unit 110 may activate the heating element 140 for a calculated period of time.

In certain embodiments, the control unit 110 includes a processor or microprocessor. The control unit 110 may include an integrated circuit and/or be implemented using one or more discrete logic components. For example, the control unit 110 may be implemented using one or more chips including gates such as AND, OR, NAND, and NOR gates. The control unit 110 may include more than one processor, microprocessor, and/or integrated circuit. For example, different functions and/or capabilities of the control unit 110 may be handled by different processors, microprocessors, and/or integrated circuits.

In certain embodiments, the control unit 110 is adapted to read and/or determine a temperature through the temperature sensor 130. The temperature may be a fluid temperature, air temperature, a temperature of all or a section of the heating element 140 and/or the plate 142, for example. Further, the control unit 110 may be capable of tracking elapsed time. For example, the control unit 110 may be capable of determine how long the heating element 140 has been activated. As another example, control unit 110 may be capable of determining and/or measuring the number of milliseconds and/or microseconds between temperature readings/determinations. In certain embodiments, the control unit 110 may read and/or determine the temperature using more than one temperature sensor. For example, the control unit 110 may average temperature readings from multiple temperature sensors. Alternatively, the control unit 110 may read and/or determine more than one temperature using more than one sensor. For example, the control unit 110 may read an air temperature from one sensor and a fluid temperature from another sensor.

The control unit 110 may be adapted to detect a dangerous condition such as an over-temperature condition. For example, one or more temperature sensors 130 may be monitored by the control unit 110 to deactivate the heating element 140 when the heating element 140 reaches a critical temperature. If some portion or section of the heating element 140 and/or the plate 142 becomes located outside of a fluid or exposed, the heating element 140 and/or the plate 142 may overheat. The overheated condition may be detected by the control unit 110, which may in turn deactivate the heating element 140 to prevent damage to the deicing system 100 and/or to other animals, persons, and/or objects near the deicing system 100.

The deicing system 100 may include a tilt switch or detector to determine whether some or all of the heating element 140 and/or the plate 142 has become exposed. For example, a drop in the water level of the fluid receptacle in which the deicing system 100 has been positioned may cause a portion of the heating element 140 and/or the plate 142 to become tilted and exposed above the level of the water. As discussed above, the exposed heating element 140 and/or plate 142 may damage the deicing system 100 and/or animals, persons, and/or other objects near the deicing system 100. The tilt switch or detector may be monitored by the control unit 110. The control unit 110 may deactivate the heating element 140 if the tilt detector indicates an attitude of the deicing system 100 in which part of the heating element 140 and/or the plate 142 may be exposed. For example, the control unit 110 may deactivate the heating element 140 if the tilt sensor indicates a tilt of greater than 20 degrees from level. In certain embodiments, the tilt switch or detector may not require monitoring by the control unit 110. For example, the tilt switch or detector may be part of the switch 120. When the tilt switch detects an attitude of the deicing system 100 that may be dangerous, the tilt switch may cut off the flow of power to the heating element 140.

The deicing system 100 may include a water sensor to determine whether the deicing system 100 is immersed in a fluid or exposed to the air. That is, a water sensor is used to detect the presence of water around the deicing system 100. As discussed above, the exposed heating element 140 and/or plate 142 may damage the deicing system 100 and/or animals, persons, and/or other objects near the deicing system 100. If water is not detected, the heating element 140 may be deactivated and/or prevented from activating. For example, if the deicing system 100 has been removed from a fluid receptacle or all of the water in the receptacle has been drained or run dry, the heating element 140 may be deactivated, or if deactivated, may be prevented from activating as a safety measure. The control unit 110 may be adapted to monitor the water sensor to control the heating element 140 based on whether water is detected around the deicing system 100. The water sensor may include a plate mounted on the deicing system 100. The control unit 110 may monitor the capacitance of the plate to determine whether the surrounding medium is air or water.

In certain embodiments, the control unit 110 may be programmable. That is, the control unit 110 may perform specific functions based at least in part on programming and/or indicators directing the control unit 110 to operate in a particular manner or perform a sequence of operations. For example, programming for the control unit 110 may be software and/or firmware. As another example, based on a switch, the control unit 110 may activate and/or deactivate the heating element 140 for a predetermined period of time. As another example, based on a pressure sensor, the control unit 110 may act as a "sinking" deicer when fluid pressure is detected and as a "floating" deicer when atmospheric pressure is detected. In certain embodiments, the control unit 110 is adapted to be programmed by a user. For example, a user may push a button to select a mode so the control unit 110 operates the deicing system 100 in that mode. In certain embodiments, the control unit 110 is adapted to be programmed by an input device. The input device may include, for example, a button, switch, tilt sensor, tip sensor, communications port, network interface, wireless interface, and/or power line communication. For example, a user may toggle a switch to indicate to the control unit 110 that the deicing system 100 should be in a particular operating mode. As another example, by applying power and removing power from the control unit 110 (e.g., by plugging in and unplugging power input connector 150), the control unit 110 may be programmed. As another example, programming information may be communicated to the control unit 110 over wireless radio or over a signal superimposed on a power signal.

The switch 120 may control the flow of power to heating element 140, for example. The switch 120 may be used to activate and/or deactivate the heating element 140 by controlling the flow of power to the heating element 140, for example. The switch 120 is controlled by the control unit 110, for example.

The control unit 110 may be configured and/or programmed such that the heating element 140 is activated when the surface temperature of the fluid approaches the freezing point. For example, when utilized as a "sinking" deicer, the temperature gradient between the top and bottom of the fluid container (e.g., a tank or pond) may be such that the control unit 110 is programmed to activate the heating element 140 at a temperature several degrees higher than it would if the deicing system 100 was floating on the surface. The deicing system 100 may utilize different operating parameters based at least in part on whether the deicing system 100 is operating as a "floating" deicer or a "sinking" deicer, for example. The operating parameters may include, for example, activation temperature(s), deactivation temperature(s), rate of temperature change, and/or amount of time heating element 140 is activated.

The temperature sensor 130 is adapted to determine and/or detect a temperature. The temperature sensor 130 may be adapted to determine the temperature of a fluid, an air temperature, a temperature of heating element 140, and/or a temperature of plate 142, for example. In certain embodiments, one or more temperature sensors may be included in the deicing system 100. For example, the deicing system 100 may include a temperature sensor 130 for determining fluid temperature and a temperature sensor 130 for determining air temperature. Moreover, the temperature sensor 130 may be adapted to communicate the detected and/or determined temperature to the control unit 110. The resolution or sensitivity of the temperature sensor 130 may be selected to be on the order of 1 degree F., for example. Alternatively, the resolution or sensitivity of the temperature sensor 130 may be selected to be on the order of 0.2 degrees F.

Although the above discussion refers to the determination of a temperature, it is to be understood that the temperature sensor may actually determine and/or measure only a current or voltage, for example, that is correlated and/or calibrated to represent a particular temperature. The temperature sensor 130 may include one or more of a thermistor, thermometer, thermocouple, resistance temperature detector, silicon bandgap temperature sensor, and/or other component adapted to create a signal that may be measured electronically and/or electrically as a function of temperature.

The temperature sensor 130 may be thermally isolated from one or more elements of the deicing system 100. For example, the temperature sensor 130 may be thermally isolated from the heating element 140 by the thermally isolating material 132. Thus, the temperature sensor 130 may determine the temperature of a fluid while the effect of heating element 140 is reduced due to the thermal isolation. The thermally isolating material 132 may include epoxy or other material with effective thermal insulation properties, for example.

The heating element 140 is adapted to transfer heat to a fluid. That is, the heating element 140 is adapted to heat the fluid. The heating element 140 may be a calorimeter rod, for example. The heating element 140 may be connected, embedded, encased, enclosed, in whole or in part, within the plate 142. The heating element 140 may be thermally coupled to the plate 142. The plate 142 may be aluminum, copper, or other element, alloy, or material capable of transferring heat from heating element 140 to a fluid.

The power input component 150 is adapted to provide power to the deicing system 100. The power input component 150 may be electrically coupled and/or connected to other components of the deicing system 100, such as the heating element 140 and/or the control unit 110. The power input component 150 may be electrically coupled to the deicing system by the power cord 152, for example. In certain embodiments, the power input component 150 includes a plug, outlet, and/or receptacle for power from a standard alternating current (AC) power source. Alternatively, the power input component 150 may draw power from a solar cell, a battery, and/or a standard electrical outlet.

In certain embodiments, some or all of the control unit 110 is located in the power input component 150. For example, the control unit 110 may include a microprocessor located in the power input component 150 that controls the operation of deicing system 100 over wires in power cord 152. In certain embodiments, the power input component includes a temperature sensor. The temperature sensor may be an air temperature sensor, for example. For example, the temperature sensor may be adapted to determine, detect, and/or compute an air temperature outside of a fluid. The temperature sensor may be monitored by the control unit 110, for example.

As mentioned above, the deicing system 100 may include the float 102. The float 102 may allow the deicing system 100 to be buoyant and/or to float in a fluid. For example, the float 102 may include one or more pieces of polystyrene. For example, the float 102 may be a formed piece of Styrofoam™, an air filled elastic tube or bladder, or the like. In certain embodiments, the float 102 may include and/or be enclosed by a cover. For example, the float 102 may be enclosed by a plastic cover which secures the float 102 to one or more other elements of deicing system 100. Thus, the float 102 may allow the deicing system 100 to act as a "floating" deicer. In certain embodiments, the float 102 is not present in the deicing system 100. Thus, the deicing system 100 may act as a "sinking" deicer. In certain embodiments, the float 102 is detachable. The float 102 may be adapted to be re-attached to the deicing system 100 after it has been removed. For example, the cover may include tabs or latches to secure the float 102 to the deicing system 100, allowing the float 102 to be attached or detached as desired. Thus, the deicing system 100 may be converted between "floating" and "sinking" configurations.

In certain embodiments, a mode sensor is monitored by the control unit 110. The mode sensor may include, for example, a temperature, pressure, tip, tilt, and/or water sensor. The control unit 110 may be adapted to determine whether the deicing system is submerged or floating based at least in part on the mode sensor, for example.

The electronics cavity 112 may provide a compartment for some or all of the electronics and/or electrical components of the deicing system 100. For example, some or all of control unit 110 and/or some or all of switch 120 may be located in the electronics cavity 112. The electronics cavity 112 may be fluid-resistant and/or fluid-proof, for example. For example, the electronics cavity 112 may be water-resistant and/or water-proof. In certain embodiments, the electronics cavity 112 is at least partially filled and/or sealed with a water-resistant material. In certain embodiments, the electronics cavity 112 is filled at least in part with an epoxy to protect the electronics from damage and/or malfunction by a fluid.

The switch 120 may be a relay or a latching relay, for example. As discussed above, the relay may be controlled by the control unit 110 to activate and/or deactivate the heating element 140. Optionally, the switch 120 may be a semiconductor switch, such as a triac. As discussed above, the triac may be controlled by the control unit 110 to activate and/or deactivate the heating element 140. The triac may be used to clip the power cycle and/or strobe power to the heating element 140, for example. In certain embodiments, the switch 120 is composed of both a relay and a triac, where one controls the other, for example.

Figure 3:
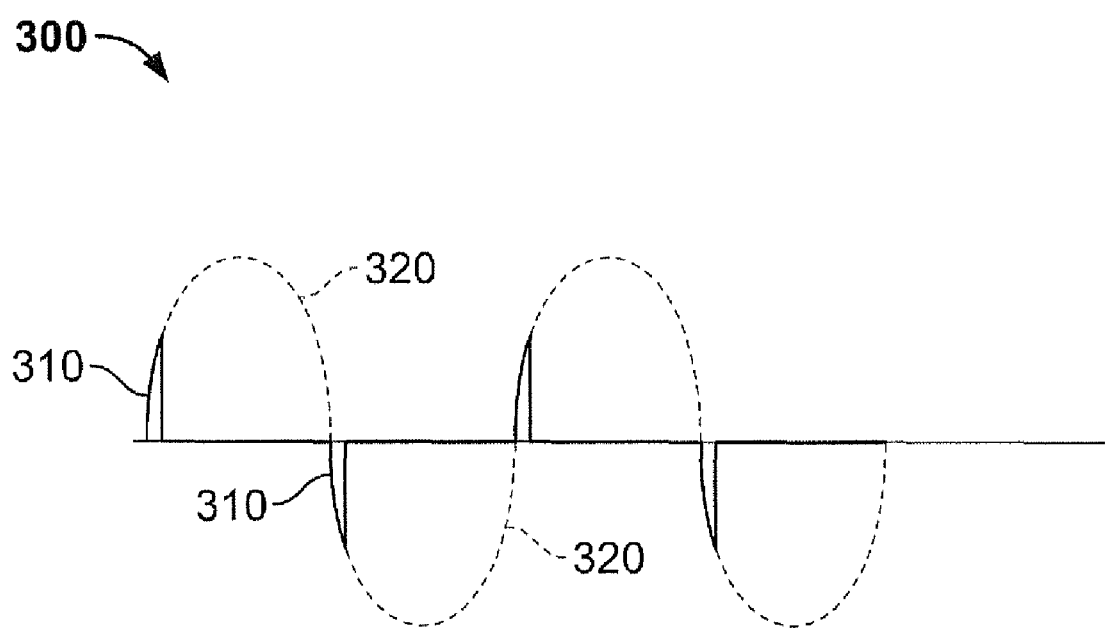
FIG. 3 illustrates a duty cycle for a heating element according to an embodiment of the present invention.
Figure 4:
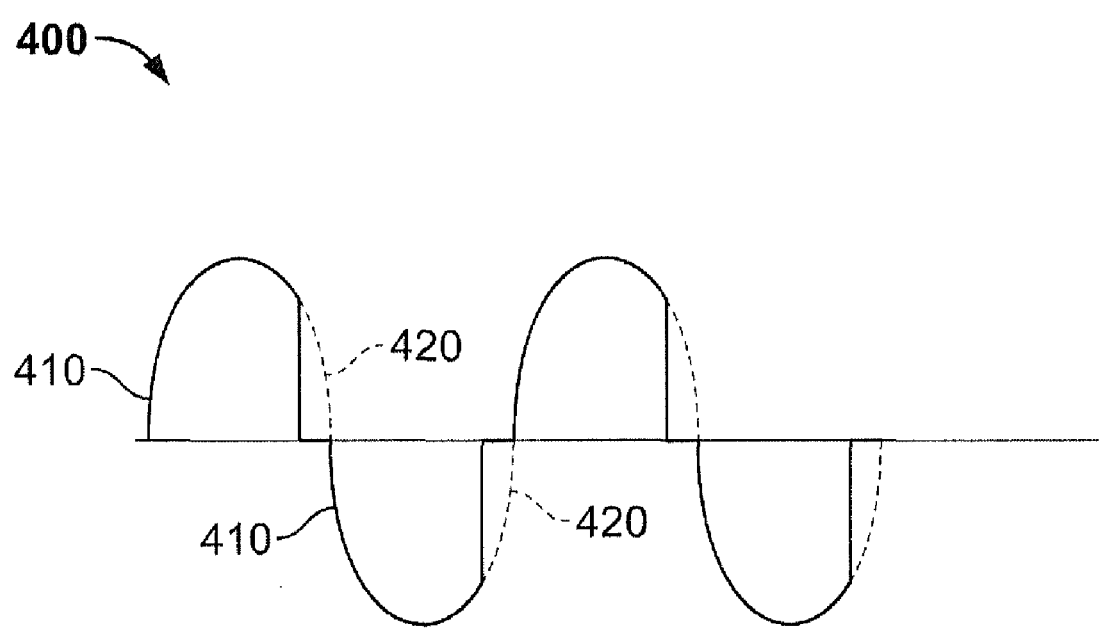
FIG. 4 illustrates a duty cycle for a heating element according to an embodiment of the present invention.

In certain embodiments when the switch 120 includes a semiconductor switch (e.g., a triac), the deicer may be operated in proportional mode. That is, the semiconductor switch may be turned on for only a portion of the cycle of the alternating current (AC) power. The heating element 140 may be activated for only a portion of the AC power cycle of the power provided by the power input component 150, for example. For example, the triac may turn on for only 25% of the power cycle. As another example, the triac may turn on for 50% of the power cycle. Proportional mode operation allows the heat output of the heating element 140 to be controlled. FIGS. 3 and 4 illustrate the heating element 140 being activated using switch 120 including a triac for different proportions of the power cycle.

FIG. 3 illustrates a duty cycle 300 for a heating element 140 (shown in FIGS. 1 and 2) according to an embodiment of the present invention. More particularly, FIG. 3 illustrates a 10% duty cycle. The solid line 310 portions of the waveform indicate the portions of the power cycle over which the heating element 140 is activated. The dashed line 320 portions of the waveform indicate the portions of the power cycle over which the heating element 140 is deactivated.

FIG. 4 illustrates a duty cycle 400 for a heating element 140 (shown in FIGS. 1 and 2) according to an embodiment of the present invention. More particularly, FIG. 4 illustrates a 75% duty cycle. The solid lines 410 portions of the waveform indicate the portions of the power cycle over which the heating element 140 is activated. The dashed lines 420 portions of the waveform indicate the portions of the power cycle over which the heating element 140 is deactivated.

In certain embodiments, proportional control may be achieved by activating and deactivating the heating element 140 in multiples of whole wavelengths of the AC power. For example, in order to achieve a 50% duty cycle, the heating element 140 is activated every other cycle. Thus, instead of activating the heating element 140 for, for example, 10% of the power cycle to achieve a 10% duty cycle, the heating element 140 may be activated for one whole wavelength and deactivated for nine wavelengths to achieve a similar effect. This mode of proportional operation may be advantageous because of the relatively high currents that may be involved (e.g., 12 Amps) When the heating element 140 is activated and/or deactivated at the nodes of the power cycle (e.g., at whole or half wavelength intervals), large transients that can cause, for example, radio interference, may be avoided.

Figure 5:
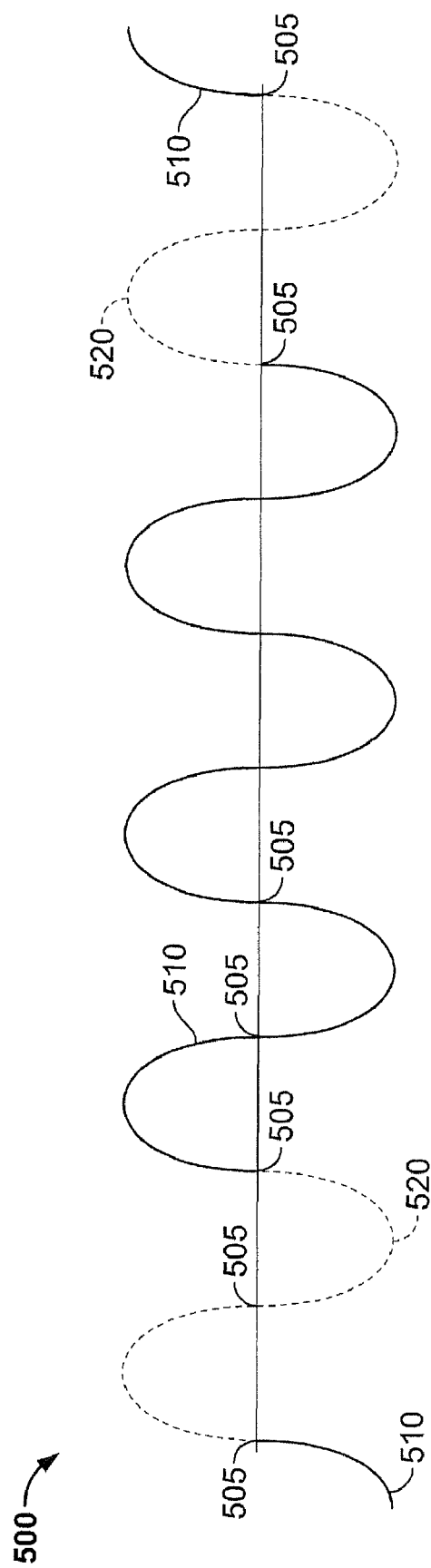
FIG. 5 illustrates a duty cycle for a heating element according to an embodiment of the present invention.

FIG. 5 illustrates a duty cycle 500 for a heating element 140 (shown in FIGS. 1 and 2) according to an embodiment of the present invention. More particularly, FIG. 5 illustrates a 75% duty cycle, where the heating element 140 is activated for three consecutive cycles, and deactivated for one cycle. The solid line 510 portions of the waveform indicate the portions of the power cycle over which the heating element 140 is activated. The dashed line 520 portions of the waveform indicate the portions of the power cycle over which the heating element 140 is deactivated. The heating element 140 is activated beginning at a node 505 of the waveform for three cycles, and then deactivated beginning at a node 505 for one cycle to achieve a 75% duty cycle.

Figure 6:
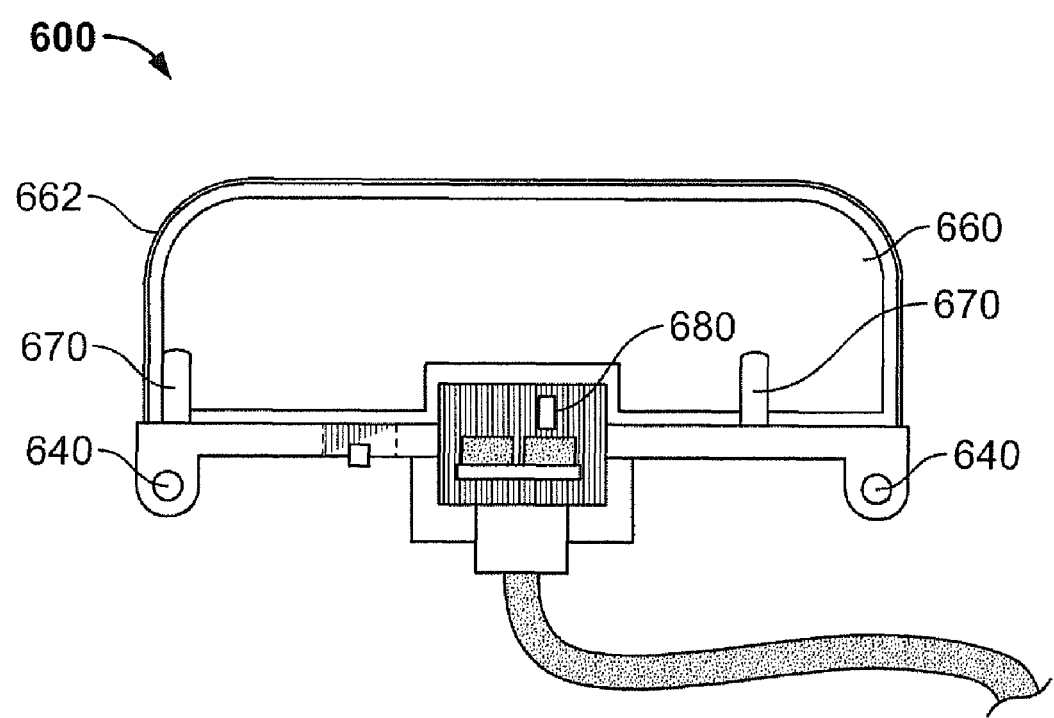
FIG. 6 illustrates a front perspective view of a deicing system according to an embodiment of the present invention.
Figure 7:
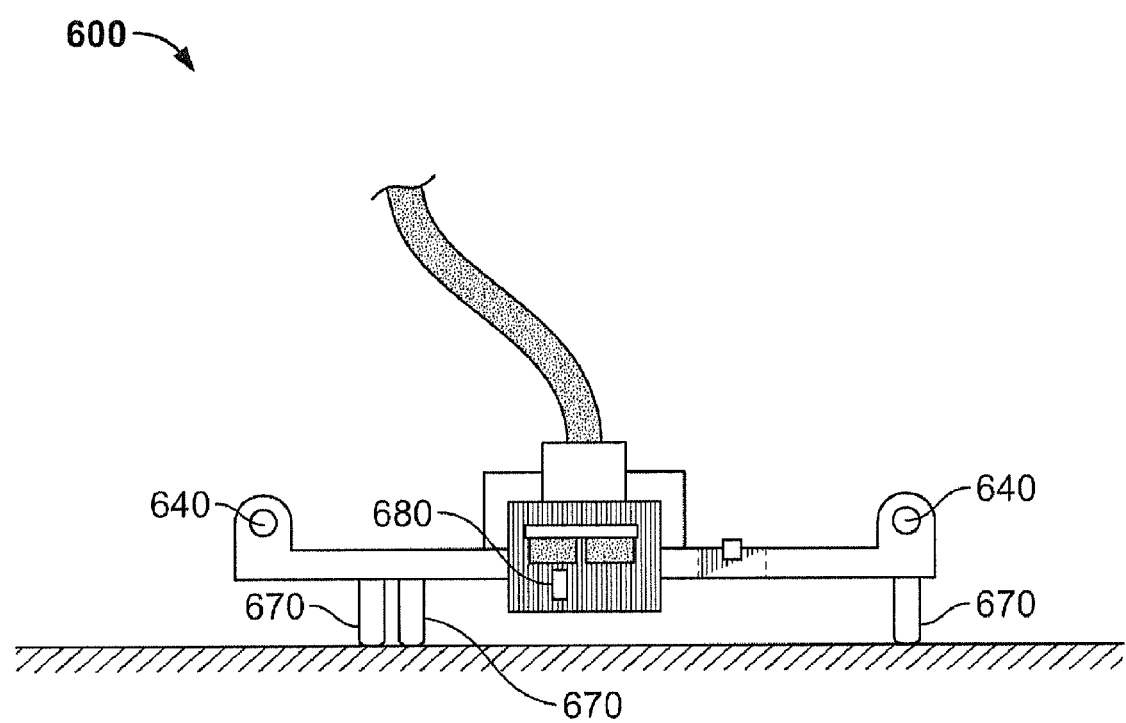
FIG. 7 illustrates a front perspective view of a deicing system according to an embodiment of the present invention.

As mentioned above, in certain embodiments, the float 102 (shown in FIG. 1) of deicing system 100 (shown in FIGS. 1 and 2) may be detachable and/or adapted to be re-attached. FIG. 6 illustrates a front perspective view of a deicing system 600 according to an embodiment of the present invention. In particular, FIG. 6 illustrates the deicing system 600 operating in a "floater" configuration. FIG. 7 illustrates a front perspective view of a deicing system 600 according to an embodiment of the present invention. In particular, FIG. 7 illustrates the deicing system 600 operating in a "sinker" configuration.

The deicing system 600 may be similar to deicing system 100, described above, for example. The deicing system 600 may further include elements similar to those in one or more embodiments of deicing system 100 with similar capabilities and/or functions, as described above, for example. The deicing system 600 includes a heating element 640, a removable float 660, a cover 662, one or more feet 670, and a tip sensor 680.

In operation, when the float 660 is attached to the deicing system 600, the deicing system 600 operates in a "floater" configuration. That is, the deicing system 600 acts as a floating deicer. The deicing system 600 will float on or near the surface of the fluid. In certain embodiments, the heating element 640 will be submerged approximately one to two inches below the surface of the fluid. The heating element 640 may be similar to heating element 140, described above, for example.

When the float 660 is detached from the deicing system 600, the deicing system 600 operates in a "sinker" configuration. That is, deicing system 600 acts as a sinking deicer. The deicing system 600 will rest on or near the bottom of the fluid container. The fluid container may be a tank or pond, for example.

Thus, the deicing system 600 may be converted between "floating" and "sinking" configurations by attaching and removing float 660. When operating in a sinking configuration, deicing system 600 may be inverted when placed into the fluid.

The float 660 may be similar to float 102, described above, for example. One or more elements of the deicing system 600 may be suspended below the float 660, for example. The float 660 may allow the deicing system 600 to be buoyant and/or to float in a fluid. For example, the float 660 may include one or more pieces of polystyrene. For example, the float 660 may be a formed piece of Styrofoam™, an air filled elastic tube or bladder, or the like. In certain embodiments, the float 660 may be secured and/or enclosed by the cover 662. For example, the float 660 may be enclosed by a plastic cover which couples the float 660 to one or more other elements of deicing system 600.

The feet 670 are adapted to hold the deicing system 600 off the bottom of a tank or pond, for example, when the deicing system 600 is operating in a "sinker" mode. In certain embodiments, the feet 670 extend to a height above the top of an electronics cavity. The electronics cavity may be similar to electronics cavity 112, described above, for example. In certain embodiments, the feet 670 may be molded as part of a base of deicing system 600. In certain embodiments, the feet 670 may be detachable. For example, the feet 670 may be attached when float 660 is removed.

The tip sensor 680 may be monitored by a control unit to determine whether the deicing system 600 should operate in a "floating" mode or a "sinking" mode. The control unit may be similar to control unit 110, described above, for example. When the tip sensor 680 indicates the deicing system 600 is "upright," the control unit operates the deicing system 600 with operating parameters for a "floating" deicer configuration. When the tip sensor 680 indicates the deicing system 600 is "inverted," the control unit operates the deicing system 600 with operating parameters for a "sinking" deicer configuration. The tip sensor 680 may alternatively be a tilt, water, and/or pressure sensor. For example, a water sensor may be mounted above the water-line position of the deicer when in a "floating" configuration, and thus, when operating in a "sinking" configuration, the water sensor will register that the deicing system 600 is submerged. In certain embodiments, the tip sensor 680 is similar to, is included in, and/or includes the mode sensor, described above. For example, the tip sensor 680 may instead be and/or include a tilt sensor.

In certain embodiments, the operating parameters are the same for both "floating" and "sinking" configurations. In certain embodiments, no control unit is present and a thermostat or other mechanical switching mechanism may be used to control the heating element.

Figure 8:
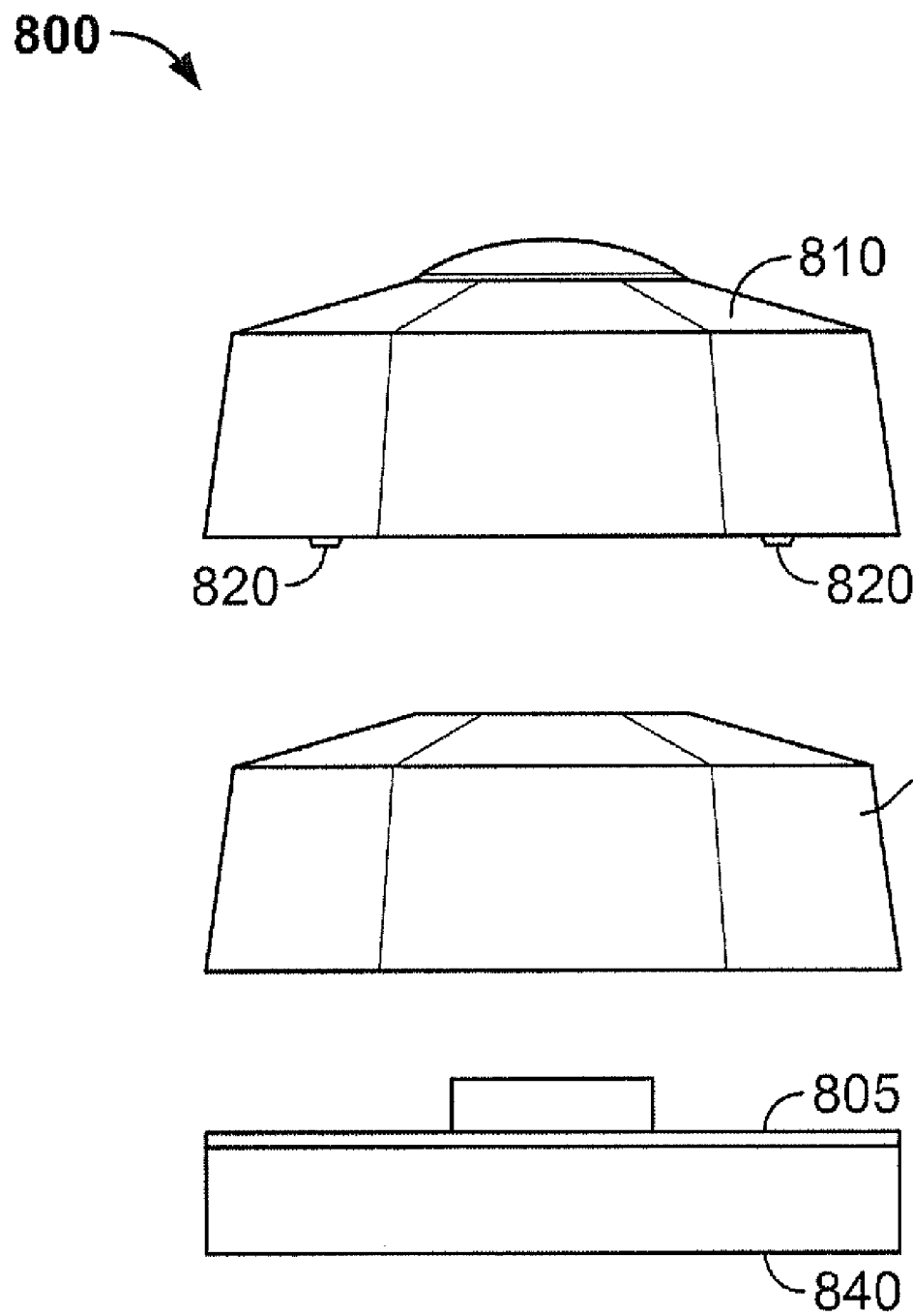
FIG. 8 illustrates an exploded front perspective view of a deicing system according to an embodiment of the present invention.

FIG. 8 illustrates an exploded front perspective view of a deicing system 800 according to an embodiment of the present invention. The deicing system 800 includes a main body 805, a cover 810, one or more tabs 820, a heater 840, and a removable float 860. The deicing system 800 may be similar to deicing systems 100 and/or 600, described above, for example. The main body 805 may be similar to the main body 105, described above, for example. The cover 810 may be similar to the cover 662, described above, for example. The heater 840 may be similar to heating element 140, described above, for example. The float 860 may be similar to floats 102 and/or 660, described above, for example.

The cover 810 may secure the float 860 to the main body 805 using one or more tabs 820, for example. The tabs 820 are adapted to allow the cover 810 to be operably connected to the main body 805. The tabs 820 may be, for example, may be plastic protrusions from the cover 810, for example. Alternatively, the tabs 820 may be latches, screwed, snap-fit, swivel connectors, or the like. The main body 805 may include, for example, slots and/or holes to facilitate connection of the cover 810.

As discussed above, the float 860 may be secured to the deicing system 800 by the cover 810 to allow the deicing system 800 to operate in a "floating" configuration. In addition, as discussed above, the float 860 may be removed from the deicing system 800 to allow the deicing system 800 to operate in a "sinking" configuration.

Figure 9:
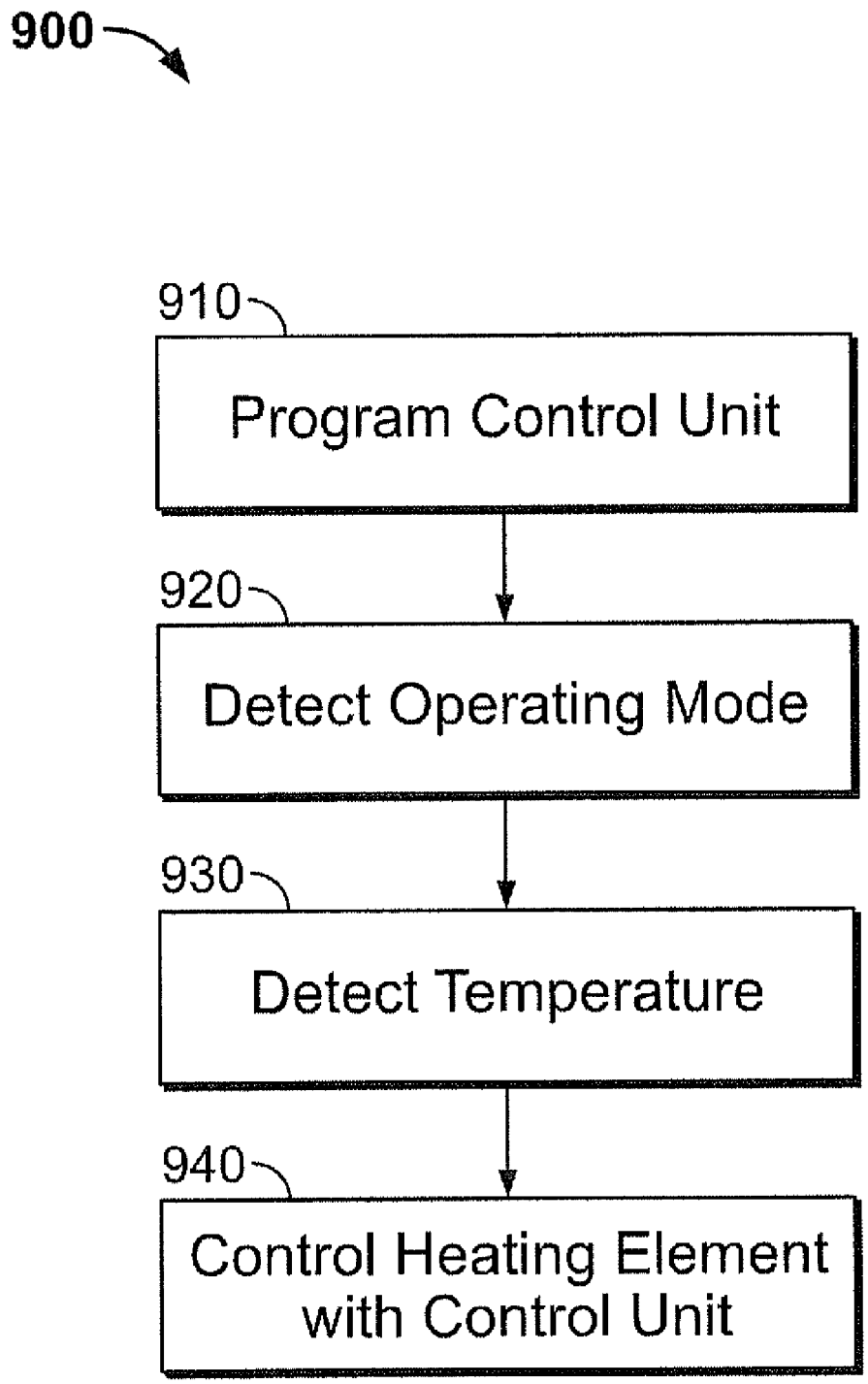
FIG. 9 illustrates a flow diagram for a method of controlling a heating element in a deicing system according to an embodiment of the present invention.

FIG. 9 illustrates a flow diagram for a method 900 of controlling a heating element in a deicing system according to an embodiment of the present invention. The method 900 includes the following steps, which will be described below in more detail. At step 910, a control unit is programmed. At step 920, an operating mode is detected. At step 930, a temperature is detected. At step 940, a heating element is controlled with a control unit. The method 900 is described with reference to elements of systems described above, but it should be understood that other implementations are possible.

At step 910, a control unit is programmed. The control unit may be similar to control unit 110, described above, for example. The control unit may perform specific functions based at least in part on programming and/or indicators directing the control unit to operate in a particular manner or perform a sequence of operations, for example. For example, programming for the control unit may be software and/or firmware. As another example, based on a switch, the control unit 110 may activate and/or deactivate heating element 140 for a predetermined period of time.

The control unit may be programmed by a user, for example. For example, a user may push a button to select a mode so the control unit 110 operates the deicing system 100 in that mode. In certain embodiments, the control unit is programmed by an input device. The input device may include, for example, a button, switch, tilt sensor, tip sensor, communications port, network interface, wireless interface, and/or power line communication. For example, a user may toggle a switch to indicate to the control unit 110 that the deicing system 100 should be in a particular operating mode. As another example, programming information may be communicated to the control unit 110 over wireless radio or over a signal superimposed on a power signal.

At step 920, an operating mode is detected. The operating mode may be detected at least in part by a mode sensor. The mode sensor may be similar to the mode sensor, described above, for example. The mode sensor may include, for example, a temperature, pressure, tip, tilt, and/or water sensor. The operating mode may be detected by a control unit using a tip sensor, such as tip sensor 680, described above, for example. The control unit may be the control unit programmed at step 910, for example. In certain embodiments, different operating parameters are used based at least in part on the detected operating mode. The operating parameters may include, for example, activation temperatures and deactivation temperatures. For example, the tip sensor 680 may be monitored by a control unit to determine whether the deicing system should operate in a "floating" mode or a "sinking" mode. When the tip sensor 680 indicates an "upright" operating mode, the control unit may operate with operating parameters for a "floating" deicer configuration. When the tip sensor 680 indicates an "inverted" operating mode, the control unit may operate with operating parameters for a "sinking" deicer configuration.

At step 930, a temperature is detected. The temperature may be detected by a temperature sensor, for example. The temperature sensor may be similar to temperature sensor 130, described above, for example. The temperature may be a fluid temperature, air temperature, a temperature of all or a section of the heating element 140 and/or the plate 142, for example. The resolution or sensitivity of the detected temperature may be on the order of 1 degree F. Alternatively, the resolution or sensitivity of the detected temperature may be on the order of 0.2 degrees F.

The temperature may be detected by a thermistor, thermometer, thermocouple, resistance temperature detector, silicon bandgap temperature sensor, and/or other component adapted to create a signal that may be measured electronically and/or electrically as a function of temperature.

In certain embodiments, a control unit may detect, read, and/or determine the temperature using one or more temperature sensors. For example, deicing system 100 may include a temperature sensor 130 for determining fluid temperature and a temperature sensor 130 for determining air temperature. The detected temperature may be communicated to the control unit 110.

At step 940, a heating element is controlled with a control unit. The heating element may be similar to heating element 140, described above, for example. The control unit may be similar to control unit 110, described above, for example. The control unit may be the control unit programmed at step 910, for example. In certain embodiments, the control unit controls the heating element by activating and/or deactivating the flow of power to the heating element. The flow of power may be controlled by a switch, for example. The switch may be similar to switch 120, described above, for example. When power flows to the heating element, the heating element generates heat. That is, the heating element is activated. When power is prevented from flowing to the heating element, the heating element does not generate heat. That is, the heating element is deactivated. In certain embodiments, control of the heating element is based on an operating mode. The operating mode may be the operating mode determined at step 920, for example. For example, the determined operating mode may result in the control unit operating with a particular set of operating parameters that determine how the heating element is controlled.

The control unit may activate and/or deactivate the heating element based at least in part on a temperature sensed by a temperature sensor. The temperature sensor may be similar to temperature sensor 130, described above, for example. The temperature may be the temperature detected at step 930, described above, for example. The temperature detected by the temperature sensor 130 may be communicated to the control unit 110, for example. In certain embodiments, the control unit may control the heating element based at least in part on elapsed time. For example, the control unit 110 may control heating element 140 based on how long heating element 140 has been activated. As another example, control unit 110 may control heating element 140 based on a measurement of the number of milliseconds and/or microseconds between temperature readings/determinations. In certain embodiments, control unit controls the heating element to prevent a dangerous condition such as an over-temperature condition. For example, one or more temperature sensors 130 may be monitored by the control unit 110 to deactivate the heating element 140 when the heating element 140 reaches a critical temperature. For example, if some portion or section of the heating element 140 and/or the plate 142 becomes located outside of a fluid or exposed, the heating element 140 and/or the plate 142 may overheat. The overheated condition may be detected by the control unit 110, which may in turn deactivate the heating element 140 to prevent damage to the deicing system 100 and/or to other animals, persons, and/or objects near the deicer system 100.

In certain embodiments, the control unit 100 may monitor a tilt switch or detector to determine whether some or all of the heating element 140 and/or the plate 142 has become exposed. For example, a drop in the water level of the fluid receptacle in which the deicing system 100 has been positioned may cause a portion of the heating element 140 and/or the plate 142 to become tilted and exposed above the level of the water. As discussed above, the exposed heating element 140 and/or plate 142 may damage the deicing system 100 and/or animals, persons, and/or other objects near the deicing system 100. The control unit 110 may deactivate the heating element 140 if the tilt detector indicates an attitude of the deicing system 100 in which part of the heating element 140 and/or the plate 142 may be exposed. For example, the control unit 110 may deactivate the heating element 140 if the tilt sensor indicates a tilt of greater than 20 degrees from level. In certain embodiments, the tilt switch or detector may not require monitoring by the control unit 110. For example, the tilt switch or detector may be part of the switch 120. When the tilt switch detects an attitude of the deicing system 100 that may be dangerous, the tilt switch may cut off the flow of power to the heating element 140.

Certain embodiments of the present invention may omit one or more of these steps and/or perform the steps in a different order than the order listed. For example, some steps may not be performed in certain embodiments of the present invention. As a further example, certain steps may be preformed in a different temporal order, including simultaneously, than listed above.

Thus, certain embodiments of the present invention provide systems and methods for a smart deicer. Certain embodiments provide a technical effect of providing a smart deicer.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A deicer system for heating water within a fluid receptacle to prevent ice from forming, the system comprising:
   a main body configured to be positioned within the fluid receptacle;
   a heating element adapted to heat the water, wherein said heating element is supported by said main body;
   a temperature sensor adapted to detect a temperature of the water;
   a switch adapted to activate and deactivate said heating element; and
   a control unit that is separate and distinct from said switch, said control unit being in communication with said heating element, said temperature sensor, and said switch, wherein said control unit is adapted to control said heating element using said switch based at least in part on a temperature detected by said temperature sensor, and wherein said control unit is adapted to be programmed at least in part by an input device.

2. The system of claim 1, wherein said temperature sensor is thermally isolated from said heating element.

3. The system of claim 1, wherein said switch includes a triac.

4. The system of claim 3, wherein said control unit controls said triac in a proportional mode, wherein the proportional mode includes enabling said triac for less than all of an alternating current cycle.

5. The system of claim 1, wherein said control unit enables and disables said switch to control said heating element at nodes in an alternating current cycle.

6. The system of claim 1, wherein said temperature sensor includes at least one of a thermistor, thermocouple, resistance temperature detector, thermometer, and silicon bandgap temperature sensor.

7. The system of claim 1, wherein said control unit comprises at least one of a processor, a microprocessor, an integrated circuit, and a plurality of discrete logic components.

8. The system of claim 1, wherein said input device includes a communications port, said communications port adapted to facilitate communication with an external programming device.

9. The system of claim 1, wherein said input device includes an antenna adapted to receive a wireless radio frequency signal.

10. The system of claim 1, wherein said control unit is adapted to control said heating element based at least in part on said temperature detected by said temperature sensor.

11. The system of claim 1, wherein said control unit is adapted to control said heating element based at least in part on a time interval.

12. The system of claim 1, further comprising a power input component electrically connected to said heating element.

13. The system of claim 12, wherein said control unit is located at least in part in said power input component.

14. The system of claim 12, wherein said power input component includes an air temperature sensor.

15. The system of claim 1, further including an air temperature sensor adapted to sense the temperature of air outside of said fluid.

16. The system of claim 1, further including a tilt sensor, wherein at least one operating parameter of said control unit is configured based at least in part on said tilt sensor.

17. The system of claim 1, further including a plurality of temperature sensors in electrical communication with said control unit.

18. The system of claim 17, wherein said control unit is adapted to monitor said plurality of temperature sensors.

19. The system of claim 18, wherein said control unit is adapted to deactivate said heating element based at least in part on said monitored temperature sensors.

20. A deicer for heating water within a fluid receptacle to prevent ice from forming, the deicer comprising:
a main body configured to be positioned within the fluid receptacle;
a heater adapted to heat the water, wherein said heater is supported by said main body;
a control unit in communication with said heater, wherein said control unit is adapted to control operation of said heater, wherein said control unit is adapted to be programmed at least in part by an input device; and
a switch, wherein said control unit is adapted to control said heater using said switch, wherein said control unit and switch are separate and distinct from one another.

21. The deicer of claim 20, wherein said input device includes a power line receiver, said power line receiver adapted to receive a programming signal superimposed on an alternating current.

22. The deicer of claim 20, wherein said switch includes at least one of a semiconductor switch and a relay.

23. The deicer of claim 20, further including a tilt sensor, wherein at least one operating parameter of said control unit is configured based at least in part on said tilt sensor.

24. The deicer of claim 20, further including a removable float, wherein said removable float is adapted to be attached and detached from said main body.

25. The deicer of claim 20, further including a tilt detector, wherein said control unit is adapted to monitor said tilt detector, and wherein said control unit is adapted to deactivate said heater based on said tilt detector.

26. The deicer of claim 20, further including a water detector, wherein said control unit is adapted to monitor said water detected, and wherein said control unit is adapted to deactivate said heater based on said water detector.

27. A method for controlling a heating element of a deicer system configured to be positioned within a fluid receptacle to prevent ice from forming within the fluid receptacle, the method comprising:
detecting a temperature of a fluid within the fluid receptacle;
communicating the detected temperature to a control unit;
programming the control unit through an input device;
determining whether the detected temperature is below a predetermined value stored within the control unit;
activating a heating element if the detected temperature is below the predetermined temperature; and
using a switch that is separate and distinct from the control unit to activate said heating element.

28. The method of claim 27, wherein said switch includes at least one of a semiconductor switch and a relay.

29. The method of claim 27, further comprising configuring an operating parameter of the control unit based at least in part on a tilt sensor.

30. A deicer for heating water within a fluid receptacle to prevent ice from forming, the deicer comprising:
a main body configured to be positioned within the fluid receptacle;
a heater adapted to heat the water, wherein said heater is supported by said main body;
a control unit in communication with said heater, wherein said control unit is adapted to control operation of said heater;
a temperature sensor in communication with said control unit, wherein said temperature sensor is adapted to detect a temperature of said fluid, and wherein said control unit is adapted to control said heater based at least in part on said temperature detected by said temperature sensor; and
a switch, wherein said control unit is adapted to control said heater using said switch, wherein said control unit and switch are separate and distinct from one another.

31. A deicer for heating water within a fluid receptacle to prevent ice from forming, the deicer comprising:
a main body configured to be positioned within the fluid receptacle;
a heater adapted to heat the water, wherein said heater is supported by said main body;
a control unit in communication with said heater, wherein said control unit is adapted to control operation of said heater;
a power input component, wherein said power input component is electrically connected to said heater, wherein said control unit is located at least in part in said power input component; and
a switch, wherein said control unit is adapted to control said heater using said switch, wherein said control unit and switch are separate and distinct from one another.

* * * * *